United States Patent [19]

Meyer et al.

[11] Patent Number: 4,879,497

[45] Date of Patent: Nov. 7, 1989

[54] METHOD AND DEVICE FOR MEASURING THE TEMPERATURE OF A BRUSHLESS D-C MOTOR

[75] Inventors: Helmut Meyer, Dossenheim; Jürgen Seeberger, Heidelberg, both of Fed. Rep. of Germany

[73] Assignee: Heidelberger Druckmaschinen AG, Heidelberg, Fed. Rep. of Germany

[21] Appl. No.: 263,001

[22] Filed: Oct. 27, 1988

[30] Foreign Application Priority Data

Oct. 27, 1987 [DE] Fed. Rep. of Germany ....... 3736303

[51] Int. Cl.⁴ .......................................... H02K 29/00
[52] U.S. Cl. ...................................... 318/254; 318/473
[58] Field of Search ............... 318/138, 254, 439, 471, 318/472, 473

[56] References Cited

FOREIGN PATENT DOCUMENTS

| | | | |
|---|---|---|---|
| 2833286 | 2/1979 | Fed. Rep. of Germany ...... | 318/473 |
| 52-48013 | 4/1977 | Japan ................................... | 318/138 |
| 53-7284 | 1/1978 | Japan ................................... | 318/473 |
| 55-137552 | 4/1982 | Japan ................................... | 318/473 |
| 1229883 | 5/1986 | U.S.S.R. .............................. | 318/473 |
| 2075291 | 11/1981 | United Kingdom ................ | 318/473 |

Primary Examiner—Bentsu Ro
Attorney, Agent, or Firm—Herbert L. Lerner; Laurence A. Greenberg

[57] ABSTRACT

A method for determining the temperature of a brushless d-c motor with a permanent-magnet rotor and an at least three-phase winding with electronic commutation including determining the curve of an EMF induced in a winding during one phase wherein the winding is in currentless condition, and evaluating the temperature therefrom.

8 Claims, 5 Drawing Sheets

METHOD AND DEVICE FOR MEASURING THE TEMPERATURE OF A BRUSHLESS D-C MOTOR

The invention relates to a method and device for measuring the temperature of a brushless d-c motor and, more particularly, such a d-c motor having a permanent-magnet rotor and an at least three-phase winding with electronic commutation.

It is generally known to provide a temperature measuring sensor in the winding for determining the motor temperature, and to measure the temperature of the winding accordingly.

It is disadvantageous, however, when using such a heretofore-known device in that the temperature can only be measured at that location at which the a:easuring sensor is found. This means that both local temperature excesses in other regions of the motor, as well as the average or mean temperature, cannot be measured.

A further possibility of measuring the winding temperature, is to measure the resistivity of the winding, and to determine excesses from this measured resistivity or resistance value and a comparative value i.e. a resistivity or resistance value of the winding when the motor is cold. Such a heretofore known method is able to be used only when the motor is not operating, however, and is thus unsuitable for monitoring the motor temperature during operation of the motor.

It is accordingly an object of the invention to provide a method and device for determining the motor temperature by means of which the temperature of the entire motor at any optional operating condition of the motor is determined.

With the foregoing and other objects in view, there is provided, in accordance with the invention, a method for determining the temperature of a brushless d-c motor with a permanentmagnet rotor and an at least three-phase winding with electronic commutation, which comprises determining the curve of an EMF induced in a winding during one phase wherein the winding is in currentless condition, and evaluating the temperature therefrom.

In accordance with another mode, the method of the invention includes forming a voltage integral of the EMF within a measuring time period $t_M$.

In accordance with a further mode, the method of the invention includes determining the temperature from the amplitude of the EMF at a given instant of time which is shiftable depending upon rotary speed.

In accordance with an additional mode of the method of the invention, the measuring time period $t_M$ is formed by a voltage zero passage and the beginning of a subsequent commutation signal.

In accordance with an added :aode, the method of the invention comprises performing a first measurement for forming a reference signal, prior to heating of the motor.

In accordance with another aspect of the invention, there is provided a device for determining the temperature of a brushless d-c motor with a permanent-magnet rotor and an at least three-phase winding, with electronic commutation, comprising an integrator having an input for receiving an EMF induced in the winding, a control device connected to the integrator for starting integration at an instant of zero passage of the EMF and for stopping the integration at the beginning of a subsequent commutation signal, and a circuit post-connected to the integrator for storing the integral of the EMF within a measuring time period in the form of a temperature-proportional signal.

In accordance with another feature of the invention, the device includes a differential amplifier connected to the input of the integrator via which the induced EMF is fed to the integrator.

In accordance with a concomitant feature of the invention, the circuit for storing the integral is a peak value rectifier.

A marked advantage of the invention is that a temperature measurement can be performed without interrupting the operation of the motor, and no additional elements with measurement sensors or the like are required to effect a temperature measurement inside the motor.

It is furthermore advantageous that this type of temperature measurement affords a relatively slight expenditure for circuit technology, and is also arrangeable supplementarily i.e. at a later time, at each motor. The device is capable of being applied at the motors at which the windings are currentless within given time periods. These are especially brushless d-c motors, but may also include stepping motors.

The method according to the invention is advantageously applicable above all for brushless d-c motors with three winding coils. As is generally known, only respective pairs of the three winding coils of a motor are traversed by current simultaneously. During the time interval in which a winding is currentless, induction voltage is generated in this winding which drops with a substantially constant, rotary speed-dependent slope from a positive to a substantially like negative value and rises from a negative to a corresponding positive value, respectively. To produce the induction voltage, also referred to hereinafter as EMF, conventional permanent magnets, such as ferrites, for example, are used. These vary the magnetic flux $\phi$ in dependence upon the temperature; a typical value for the variation or cange is, for example, $-0.2\%$ per °K. The induction voltage (EMF) is thereby varied at constant rotary speed.

With respect to the mode of the method wherein the voltage integral of the EMF is formed within the measuring time period, it is noted that this formation is solely dependent upon the temperature and behaves linearly with the temperature change.

In accordance with a further mode of the method invention, the instant of measuring is selected so that the greatest possible measuring time period is formed. This occurs due to the fact that the voltage zero passage of the EMF defines the starting signal, and the beginning of the succeeding commutation signal defines the stop signal for the integration.

The method of the invention is appliable in an advantageous manner also when the connection or association between the EMF and heating of the magnets is unknown. In this case, a reference signal can be formed by a first measurement before heating of the motor, and this reference signal can be used with subsequent measurements taken during operation of the motor, taking into account the temperature constants of the magnet material, for determining the temperature of the motor.

The method according to the invention is realizable in a device according to the invention, as described hereinbefore. To determine the integral over a very long time interval, the peak value rectifier is provided in an advantageous manner so that heating of the motor may be continually monitored.

Other features which are considered as characteristic for the invention are set forth in the appended claims.

Although the invention is illustrated and described herein as embodied in a method and device for measuring the temperature of a brushless D-C motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which: FIG. 1 is a series of plot diagrams of which (a), (b) and (c) are of the time rate of change of an electric force (EMF), and (d), (e) and (f) are of commutation signals;

Figure 1:
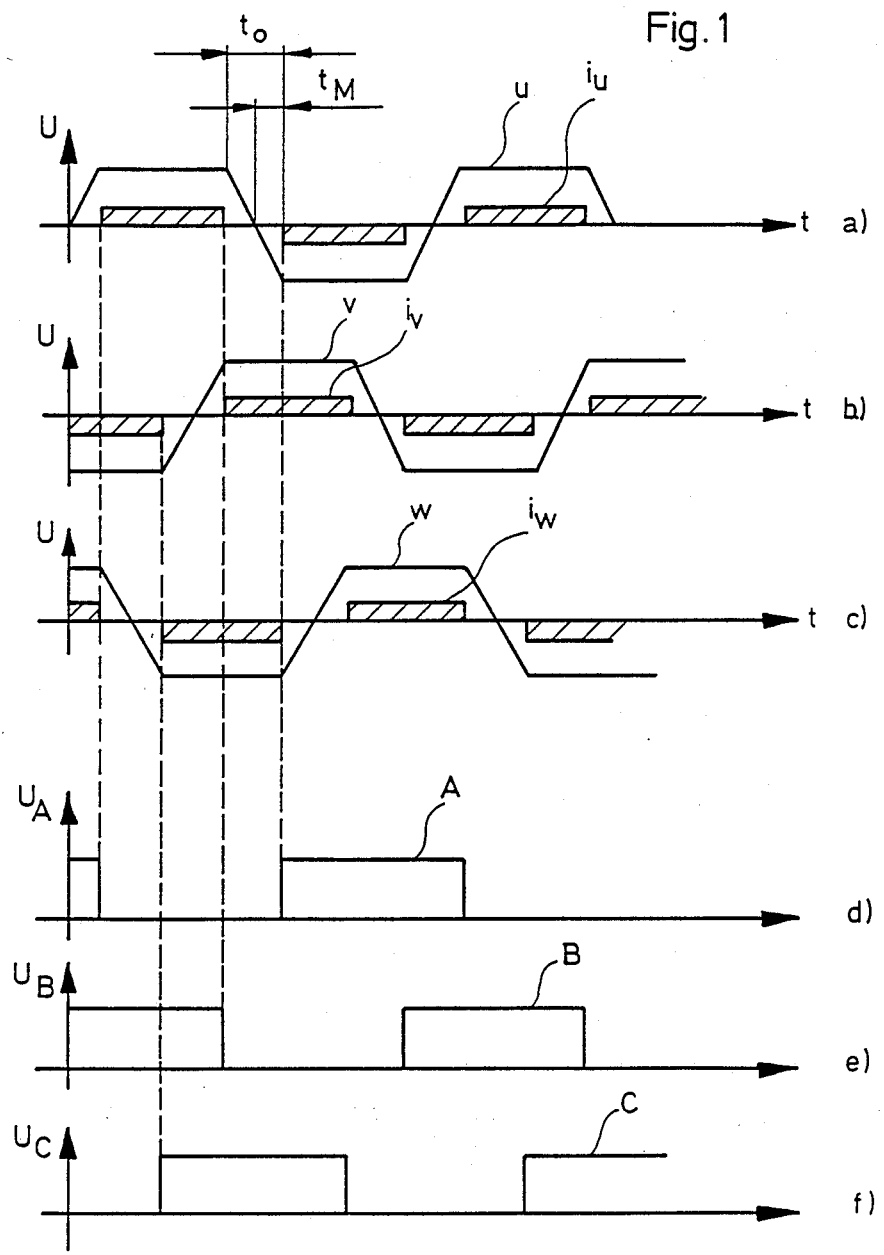

Referring now to the drawing and, first, particularly to FIG. 1 thereof, there are represented therein in diagrams (a), (b) and (c) the time rate of change of the EMF induced in individual phases. A curve of the signal u in diagram (1a) shows the EMF in phase 1, the signal curve v in diagram (1b) in phase 2, and the signal curve w in diagram (1c) in phase 3. These signal curves result for a rotor of conventional construction. In those regions wherein the EMF extends approximately linearly in the individual phases, the respective phases are subjected to current which is represented by the signals $i_u$, $i_v$ and $i_w$ in the respective diagrams (1a), (1b) and (1c). Control of the currents $i_u$, $i_v$ and $i_w$ is effected by motor commutation. Commutation signals A, B and C are shown in the diagrams (1d), (1e) and (1f) of FIG. 1.

During the time periods wherein the EMF runs from a positive to a negative value and in reverse, respectively, the respective phase is in a currentless condition. This currentless time interval represented in diagram (1a) by $t_o$, can be utilized to perform measurements of the induction voltage. The beginning of this time interval is defined by a switching off of the respective phase current due to a commutation signal. The end of the time interval is likewise caused by a next commutating signal which defines the beginning of the next time interval wherein this phase has an applied current. In the illustrated example, the currentless time interval t·in diagram (1a) is initiated by the commutation signal B in diagram (1e), and is terminated by the commutation signal A in diagram (1d). The actual measuring time period within this currentless time interval $t_o$ is started by the zero passage of the EMF i.e. its passage through zero. Obviously, it is also possible to use the entire currentless time interval $t_o$ as the measuring time period. In such a case, the induction voltage is to be rectified for a further processing. It has been shown, however, that the measuring time period $t_M$ is quite sufficient for determining the exact motor temperature.

Figure 2:
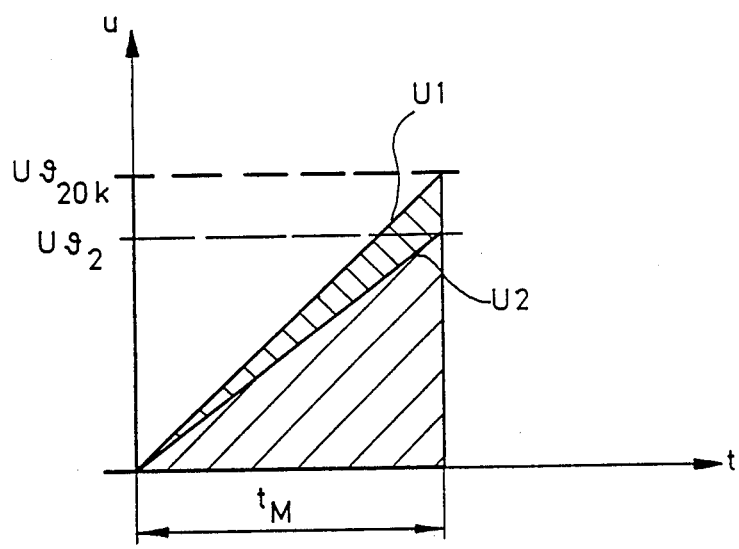
FIG. 2 is a plot diagram of the time rate of change of the EMF for varying motor temperatures.

In FIG. 2, the EMF curve within the measuring time period $t_M$ is represented in an enlarged view. In the interest of simplification, the curve of the EMF within the measuring time period $t_M$ is negated, so that it then increases to a positive value starting from a zero level.

For a motor having a temperature corresponding to that of the ambient temperature, the rise of the EMF follows the curve represented by $u_1$. A prerequisite of this curve is that variations in flux of the permanent magnets due to conditions of manufacture are excluded, and are adjusted for each motor in the same manner. During operation of the motor, the magnetic flux of the permanent magnets varies due to the heating of the motor and consequent heating of the permanent magnets. This effects a variation of the EMF induced in the respective phase, for a constant rotary speed. The increase in the EMF within the measuring time period $t_M$ becomes flatter (curve $u_2$), so that, after the expiration of the time period $t_M$, a final value is set at $u\vartheta_2$. Due to the linear dependence of the magnetic flux upon the temperature, the temperature of the permanent magnets and consequently of the motor is thus able to be determined from the value of the induction voltage $u\vartheta_2$ determined after the measuring time period $t_M$.

For a motor wherein the dependence of the magnetic flux and the temperature upon one another is known, the determination of the value $u\vartheta_2$ is fully adequate. The possibility also exists of performing a measurement of the EMF before operation of the motor in order to attain a reference signal and, building on this reference signal, to evaluate the change in the EMF. Flux variations of the permanent magnets due to manufacturing conditions are thereby able to be excluded from the measurement result.

In order to be independent of rotary speed, it is advantageous not to evaluate the rotary speed-dependent EMF, but rather, the voltage time integral of the EMF which is constant over all rotary speeds.

The motor temperature $\vartheta_M$ is determined then in accordance with the equation:

$$\vartheta_{Mt} = K \int u \, dt,$$

wherein K is a temperature-dependent constant of the permanent magnets and represents a conversion constant.

Figure 3:
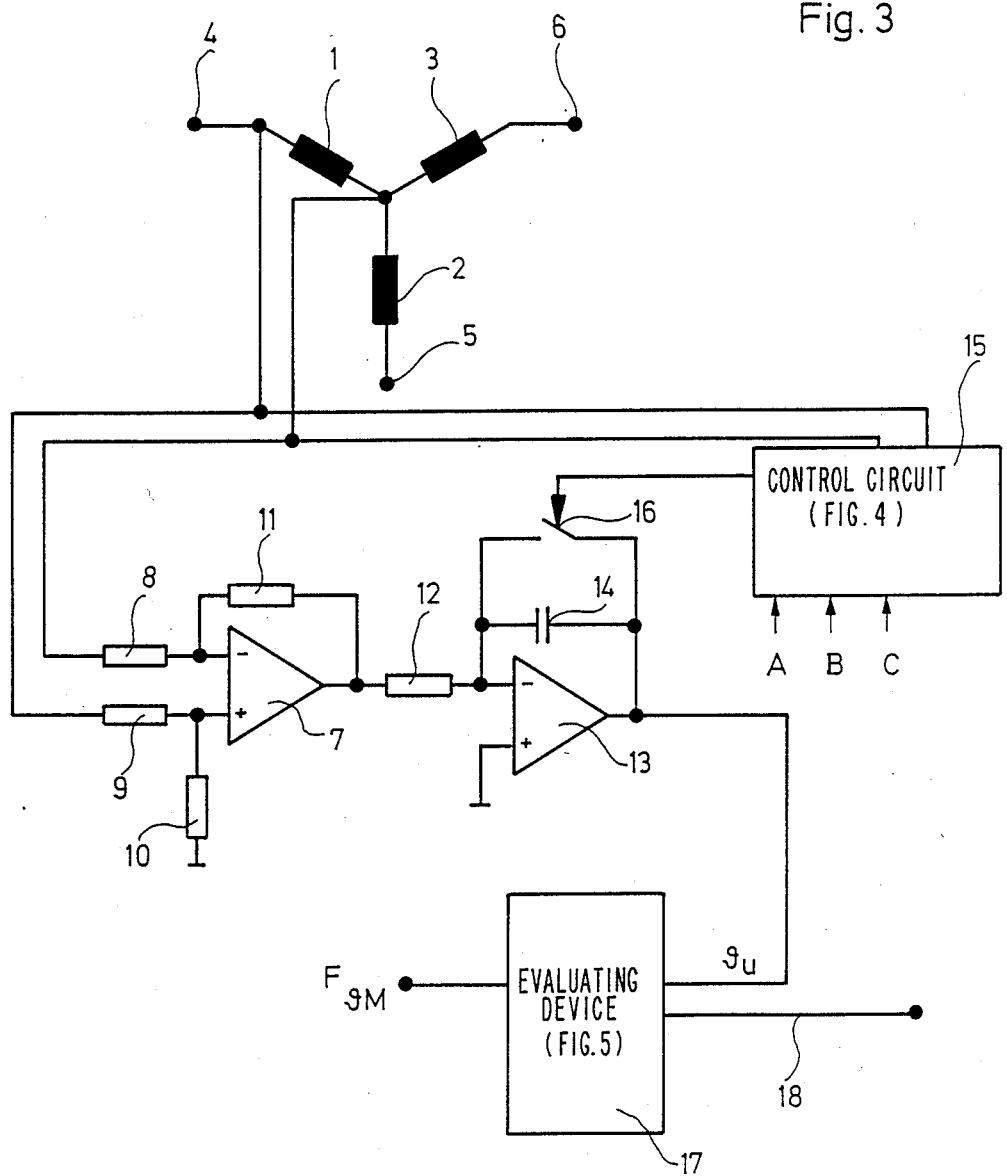
FIG. 3 is a circuit diagram of a device for determining the motor temperature.

FIG. 3 is a circuit diagram of a device by which the motor temperature may be determined. In this figure, three motor windings 1, 2 and 3 are shown to which current is applied via terminal clamps 4, 5 and 6 in accordance with the motor commutation. To evaluate the EMF of the phase 1 induced in the motor winding 1, a differential amplifier 7 is provided with input resistances 8, 9 and 10 and a back coupling or feedback resistance 11, to which the voltage existing across the motor winding 1 is fed. The differential amplifier 7 delivers an output signal via an output resistance 12 to an integrator 13 connected with a feedback condenser 14. A control circuit 15, which senses the voltage zero passage by the evaluation of the voltage across the motor winding 1 and which applies the commutation signals $U_A$, $U_B$ and $U_C$, controls, in accordance with these respectively supplied and sensed signals, a switch 16 for discharging the feedback condenser 14 in a manner that, at the beginning to the measuring time period $t_M$, an integration of the induction voltage, starting from a non-load condition of the integrator 13, occurs. The output signal of the integrator 13 is fed to an evaluating device 17. The evaluating device 17 forms an alarm message $F\vartheta_M$ ($\vartheta_M$ >normal temperature) which is then available for further processing and, if necessary or desirable, for viewing on a display or monitor.

Figure 4:
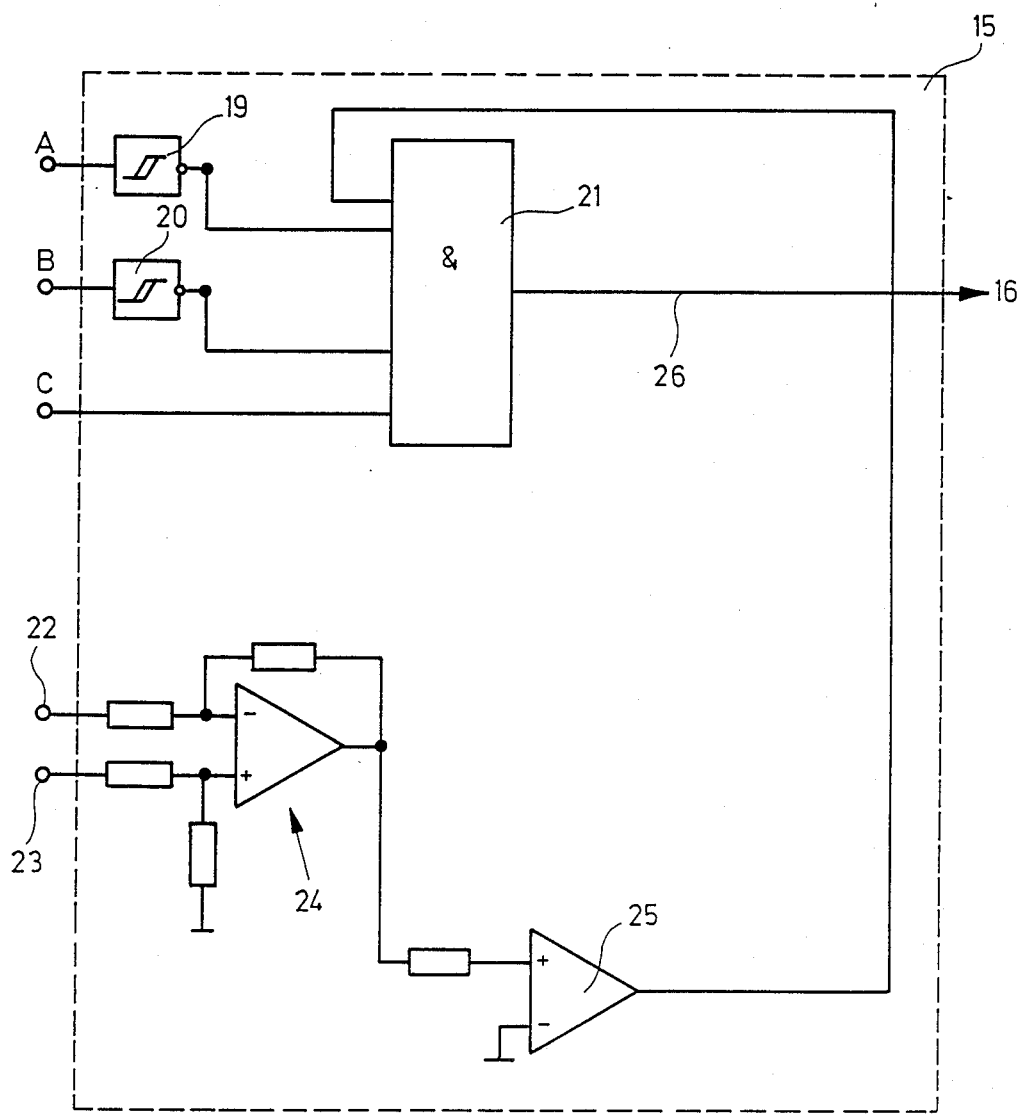
FIG. 4 is a plot diagram showing the construction details of a control circuit for an integrator which forms part of the device of FIG. 3.

The construction of the control circuits 15 for the integrator 13 is shown in FIG. 4. The commutation signals A and B are respectively fed via a negation unit 19, 20 to an AND-circuit 21. The commutation signal C is fed directly to the AND-circuit 21. The voltage signal tapped from the motor winding 1 is fed via the clamps 22 and 23 to an inverting amplifier 24 provided with series resistors. The inverting amplifier 24 forms a positive output signal at the instant at which the EMF at the motor winding 1 passes through zero. This positive output signal is fed via an amplifier 25 likewise to the AND-circuit 21. Due to the commutation signals A, B and C and the positive output signal of the inverting amplifier 24, the output level of the AND-unit 21 goes to "High". This output signal controls the switch 16 so that it is opened at the beginning of the measuring time period i.e. by the signal "High". The end of the measuring time period is defined by the commutation signal A. The instant this commutation signal A is switched on, a "Low" level appears at the output of the negation unit 19, which forms a "Low" level at the output of the AND-unit 21. This "Low" level, as the output signal 26 of the AND-unit 21, effects a closure of the switch 16 and, accordingly, a discharge of the condenser 14.

Figure 5:
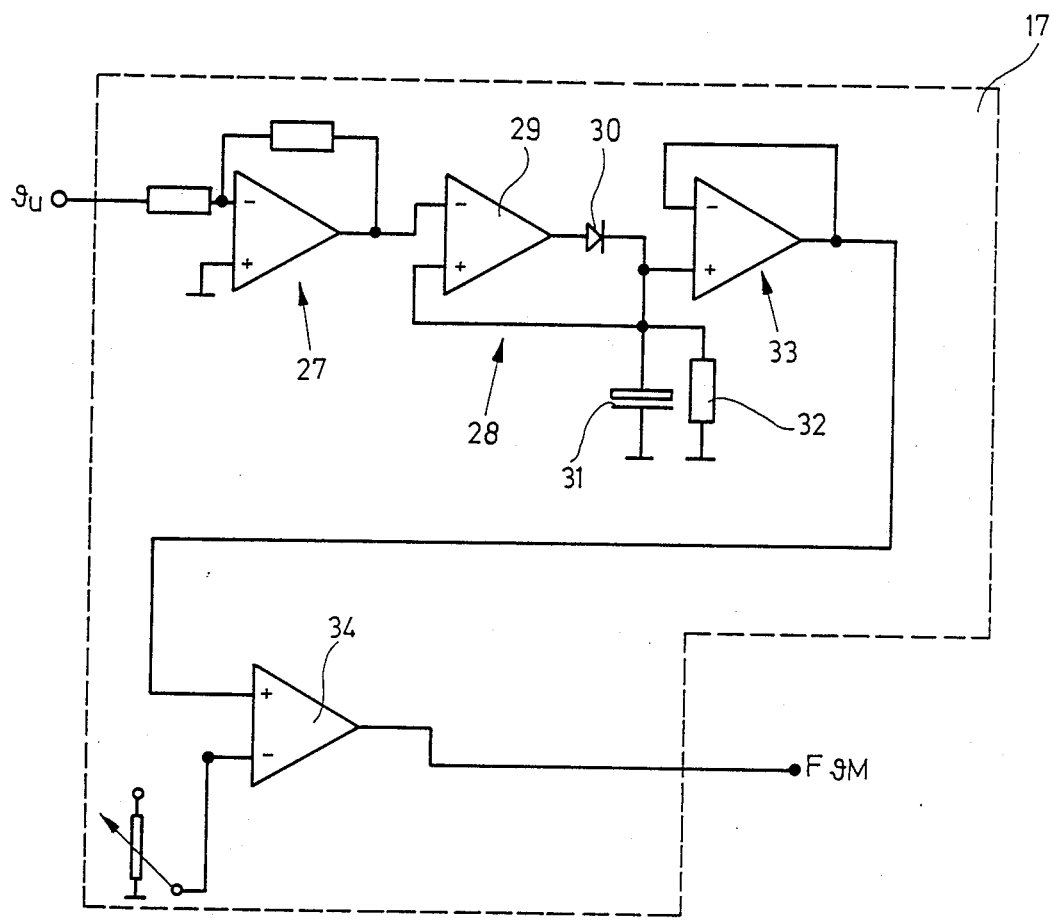
FIG. 5 is a plot diagram showing the construction details of an evaluating device which forms part of the device of FIG. 3.

The construction of the evaluation device 17 of FIG. 3 is shown in FIG. 5. The output signal formed by the integrator 13 is fed via an inverting amplifier 27 to a peak value rectifier 28 formed of an operational amplifier 29, a rectifier diode 30, a condenser 31 and a resistance 32 connected in parallel with the condenser 31. A comparator 34 receives a reference voltage signal at an inverting input 35 thereof. This reference voltage signal is proportional to the maximum temperature. If the voltage signal formed by the peak value rectifier 28 exceeds this reference signal, the comparator 34 generates an output signal which represents the alarm message $F\vartheta$.

As mentioned hereinabove, the EMF decreases with increasing motor temperature. This means that the comparator 34 generates a "High"-level as output signal during normal operation of the motor. An excess temperature of the motor, which, must be displayed or indicated, is then attained, if the output voltage formed by the peak value rectifier 28 drops below the reference voltage at the inverting input 35 (comparator threshold). At this instant, the comparator 34 forms a "Low"-level at the output thereof. This zero level produces an alarm message at the output.

Naturally, the temperature of the permanent magnets of the rotor is determined with this device primarily. Due to the compact construction of a DC-motor starting from the temperature thereof, conclusion can be drawn, moreover, with great accuracy regarding the temperature of the stator and, accordingly, regarding the temperature of the entire motor.

The foregoing is a description corresponding in substance to German Application P 37 36 303.4, dated Oct. 27, 1987, the International priority of which is being claimed for the instant application, and which is hereby made part of this application. Any material discrepancies between the foregoing specification and the aforementioned corresponding German application are to be resolved in favor of the latter.

We claim:

1. Method for determining the temperature of a brushless d-c motor with a permanent-magnet rotor and an at least three-phase winding with electronic commutation, which comprises determining the curve of an EMF induced in a winding during one phase wherein the winding is in currentless condition, and evaluating the temperature therefrom.

2. Method according to claim 1, which includes forming a voltage integral of the EMF within a measuring time period $t_M$.

3. Method according to claim 1, which includes determining the temperature from the amplitude of the EMF at a given instant of time which is shiftable depending upon rotary speed.

4. Method according to claim 2, wherein the measuring time period $t_M$ is formed by a voltage zero passage and the beginning of a subsequent commutation signal.

5. Method according to claim 1 which comprises performing a first measurement for forming a reference signal, prior to heating of the motor.

6. Device for determining the temperature of a brushless d-c motor with a permanent-magnet rotor and an at least three-phase winding, with electronic commutation, comprising an integrator having an input for receiving an EMF induced in the winding, a control device connected to said integrator for starting integration at an instant of zero passage of the EMF and for stopping the integration at the beginning of a subsequent commutation signal, and a circuit post-connected to said integrator for storing the integral of the EMF within a measuring time period in the form of a temperature-proportional signal.

7. Device according to claim 6, which includes a differential amplifier connected to said input of said integrator via which the induced EMF is fed to said integrator.

8. Device according to claim 6 wherein said circuit for storing the integral is a peak value rectifier.

* * * * *